(12) United States Patent
Henkenhaf

(10) Patent No.: US 7,402,021 B2
(45) Date of Patent: Jul. 22, 2008

(54) FLUID ACTIVATED WHEEL/GENERATOR PAIR

(76) Inventor: Willi Henkenhaf, 48602 30th Sideroad, RR 1, Shelbourne, Ontario (CA) L9Y 5C9

( * ) Notice: Subject to any disclaimer, the term of this patent is extended or adjusted under 35 U.S.C. 154(b) by 142 days.

(21) Appl. No.: 10/561,044

(22) PCT Filed: Dec. 31, 2003

(86) PCT No.: PCT/CA03/02034

§ 371 (c)(1),
(2), (4) Date: Dec. 16, 2005

(87) PCT Pub. No.: WO2004/109097

PCT Pub. Date: Dec. 16, 2004

(65) Prior Publication Data

US 2007/0110556 A1  May 17, 2007

(30) Foreign Application Priority Data

Jun. 16, 2003  (CA) .................................... 2432458

(51) Int. Cl.
*F03B 3/12* (2006.01)
(52) U.S. Cl. ........................ 415/3.1; 416/128
(58) Field of Classification Search ................ 416/128, 416/124, 17; 415/3.1, 4.2, 4.4, 906, 907
See application file for complete search history.

(56) References Cited

U.S. PATENT DOCUMENTS

| | | | |
|---|---|---|---|
| 326,718 A | 9/1885 | Collins | |
| 376,367 A | 1/1888 | Busenbarrick | |
| 867,459 A | 10/1907 | Willard | |
| 958,467 A | 5/1910 | Bennett | |
| 1,023,378 A | 4/1912 | Hay | |
| 1,326,769 A | 12/1919 | Munn | |
| 1,364,681 A | 1/1921 | Barto | |
| 1,487,391 A | 3/1924 | Kochlin | |
| 3,870,893 A | 3/1975 | Mattera | |
| 3,922,013 A | 11/1975 | Tidwell | |
| 3,928,771 A | 12/1975 | Straumsnes | |
| 4,057,270 A * | 11/1977 | Lebost | 415/4.4 |
| 4,245,958 A | 1/1981 | Ewers | |
| 4,365,935 A | 12/1982 | Zukeran | |
| 4,649,284 A | 3/1987 | Hsech-Pen | |
| 4,818,180 A | 4/1989 | Liu | |
| 4,960,363 A | 10/1990 | Bergstein | |
| 5,246,342 A | 9/1993 | Bergstein | |
| 5,289,042 A | 2/1994 | Lis | |
| 5,333,996 A | 8/1994 | Bergstein | |
| 5,380,149 A | 1/1995 | Valsamidis | |
| 6,109,863 A | 8/2000 | Milliken | |
| 6,537,018 B2 | 3/2003 | Streetman | |
| 2002/0141858 A1 * | 10/2002 | Downing | 415/3.1 |

* cited by examiner

*Primary Examiner*—Richard Edgar
(74) *Attorney, Agent, or Firm*—Defillo & Associates, Inc.; Ellelyn A. Defillo

(57) ABSTRACT

The invention provides a pair of co-rotating fluid powered wheel and generator pairs each rotating about a single vertical axis. Each wheel/generator is mounted on a respective axle one of which is solid and the other tubular. Separation of fluid flow into 2 streams engages the wheels for rotation in opposite directions. Folding paddles collapse and extend to engage the moving fluid.

20 Claims, 5 Drawing Sheets

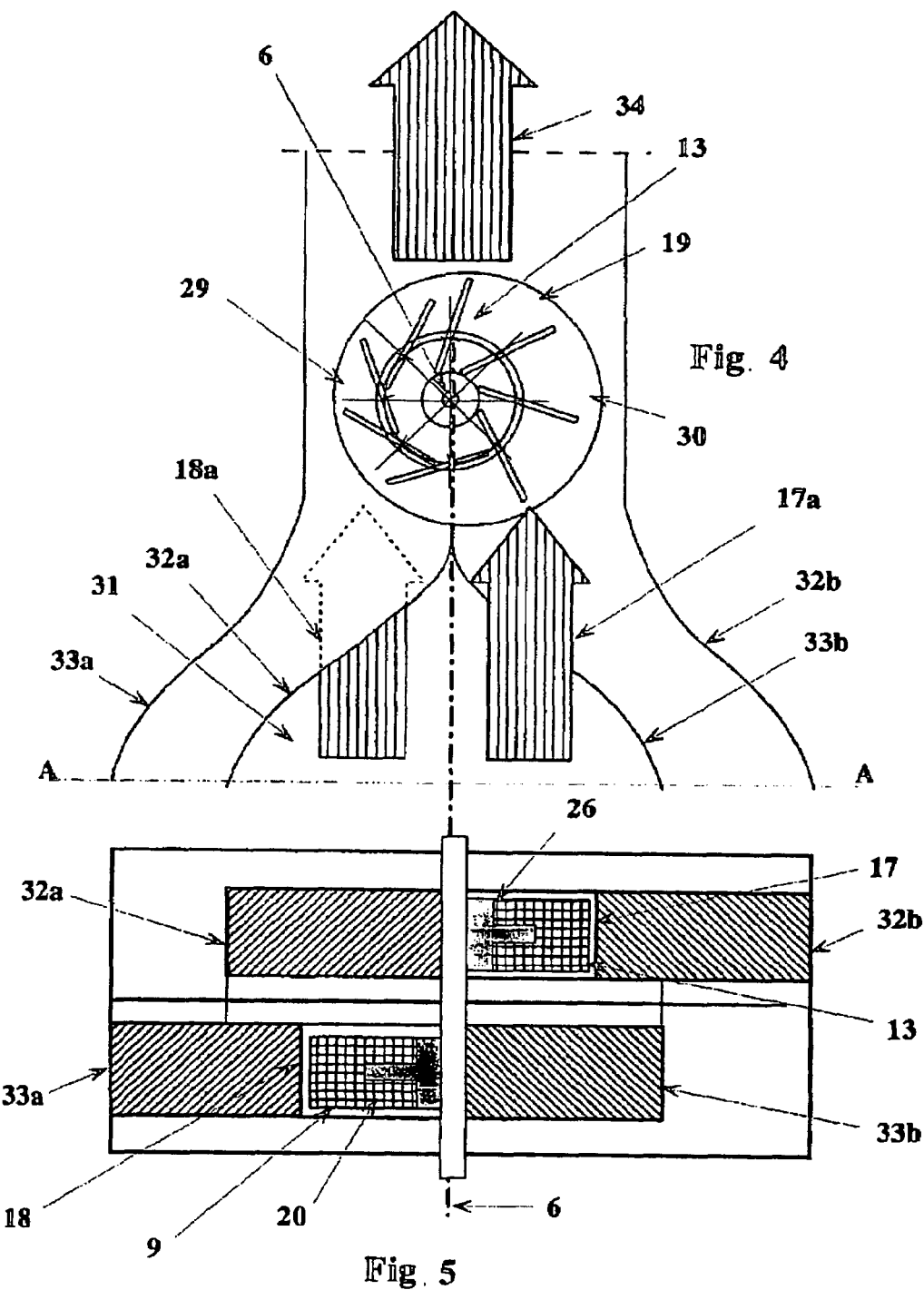

FLUID ACTIVATED WHEEL/GENERATOR PAIR

BACKGROUND

Power generators have been known for many years and are often combined in multiple units to increase available power. Such generators are activated by moving wind or water and utilize the kinetic energy of the moving fluid to provide mechanical energy usually in the form of rotation of mechanical components. The moving fluid interacts with a series of paddles which rotate under the force of the movement. When connected to an electrical generator electric power is produced. Wheels may have fixed or movable paddles each of which interact with a moving fluid such as water or air in turn to provide the source of work. Movable paddles typically enhance the work available from the moving fluid stream by confining water and wheel interaction for desirable rotation.

PRESENT INVENTION

The present invention seeks to overcome disadvantages of multiple unit fluid and water wheels as known in the prior art in a manner both economical and susceptible to long service life.

It is a further object of the invention to provide ready movability of the wheel assembly and its major components and maintenance both on and off site, particularly off-site where maintenance may be economically conducted while substituted components continue the necessary functions.

It is a further object of the invention to provide relative high efficiency in resultant power generation and lower maintenance costs in an environmentally friendly manner with provision for passage of life and fluid-borne debris.

The present invention provides a balanced counter-rotating pair of fluid activated wheel/generator pairs mounted for co-axial rotation.

DRAWINGS

FIG. 4 shows a plan view of the preferred embodiment including a funnel entry

FIG. 5 shows a cross-section along line A-A of FIG. 4.

THE PREFERRED EMBODIMENTS

Figures 1, 2:
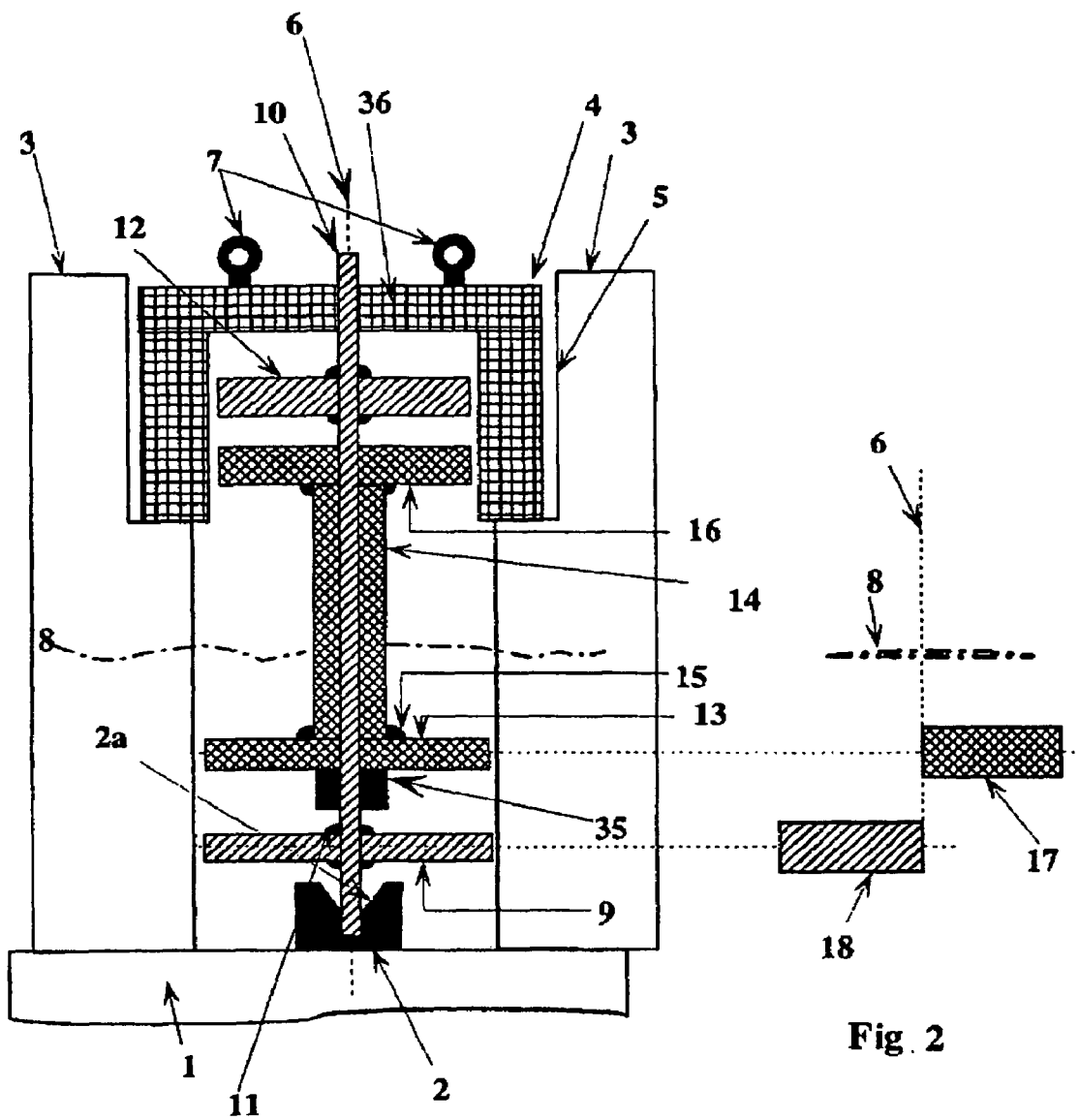
FIG. 1 shows a cross-section of the preferred embodiment of the invention as applied to a moving water stream.
FIG. 2 shows a cross-section of the 2-part moving water stream as it is presented to the Left Turning and Right Turning wheels of FIG. 1.

The preferred embodiment shown in FIG. 1 provides a base 1 typically constructed of concrete or like material resting on the bed of the body of moving water. The moving water has a nominal water level as at 8 in FIG. 1. Preferably base 1 includes a main support bearing block 2 and suitable centering and alignment means 2a.

Tubular casement 3 is lowered on to the base 1 and axially aligned with block 2.

Preferably, wheel/generator combination 4 is a single unit lowered into place co-axially with casement 3 so as to rest on bearing block 2 and with main co-axis 6 being generally vertical. Lifting eyes 7 are provided in wheel/generator 4 for ease of installation and removal. Alternatively, wheel/generator 4 may include bearing block 2 as a single unit. In this configuration, means such as co-operating recesses (not shown) between base 1 and casement 2 provide for self-aligning co-axial installation.

Preferably casement 3 is provided with a recess 5 adapted to both support wheel/generator 4 and maintain co-axis 6 vertical over bearing block 2. Right-turning (RT) water wheel 9 is fixed to solid central axle 10 as by welding or other means as at 11 in FIG. 1. Rotational motion of the RT water wheel 9 is transmitted upwards by axle 10 and causes corresponding right turning motion of the right-turning (RT) generator armature 12 and production of electric power.

Left-turning (LT) water wheel 13 is fixed to tubular central axle 14 as by welding or other means as at 15 in FIG. 1. Rotational motion of the LT water wheel 13 is transmitted upwards by tubular axle 14 and causes corresponding left turning motion of the left-turning (LT) generator armature 16 and production of electric power.

Vertical positioning of LT water wheel 13 is maintained by bearing block 35 affixed to solid axle 10.

Preferably solid axle 10 is also supported for vertical alignment by centering support 36.

Axles 14 and 10 are co-axial about co-axis 6 and provide that both the RT and the LT armatures 12 and 16 respectively provide work energy simultaneously to the generator portion 4

As shown schematically in FIG. 2 the casement 3 is provided with upper and lower water channels 17 and 18 respectively which individually direct water flow against the LT and RT water wheels 13 and 9 on either side of co-axis 6 for opposite rotation of the water wheels with a single flow of water.

Figures 3A, 8:
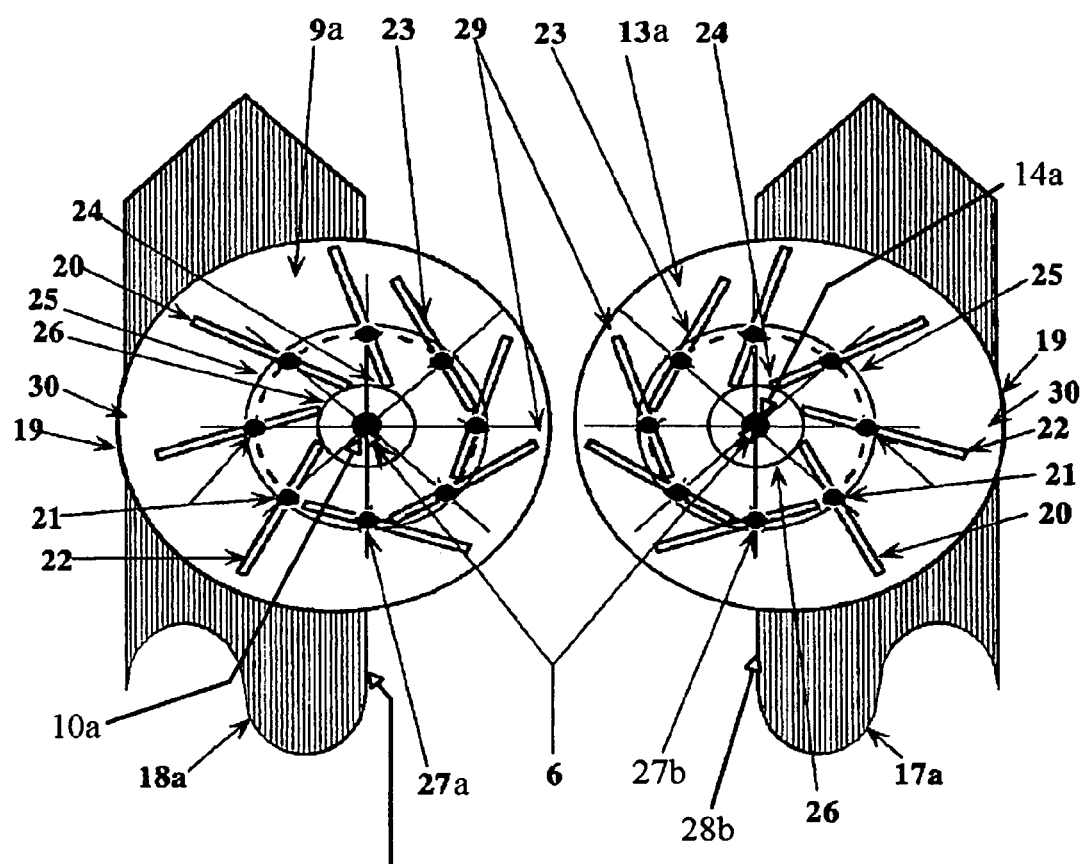
FIG. 3a shows a plan view of the Left Turning wheel.
FIG. 8 shows a plan view of the Right Turning wheel.

FIGS. 3a and 3b show plan views of the preferred embodiment of the invention.

FIG. 3a shows the RT (lower) water wheel 9 in plan view and its corresponding water flow 18a. Water flow 18a passes through and around water wheel 9 to cause rotation of the wheel 9 on vertical axle 10 about co-axis of rotation 6.

FIG. 3b shows a plan view of the LT (upper) water wheel 13 and its corresponding water flow 17a. Wheel 13 is rotated counterclockwise by the movement in water flow 17a around tubular axle 14 about co-axis 6.

Each of the water wheels is constructed of a central disk 25 and a hub 26. A series of paddles are each mounted to the disk 25 for rotation about a vertical axle 21 from a fully open water-engaging position 22 to a fully collapsed position 23. In the open position 22 the innermost end of paddle 20 abuts hub 26 and engages the corresponding wheel.

The LT and RT water wheels 13 and 9 are mirror images of each other in plan view in the preferred embodiment and can be constructed of essentially the same components for ease of manufacture, assembly and repair. Preferably each wheel has the same number of equally-spaced identical paddles 20 arranged with their forward positions, as at positions 27a and 27b respectively, in vertical alignment.

Preferably forward positions 27 correspond with the corresponding inner edges 28a and 28b of the water flows 17a and 17b respectively.

Significant spacing may be provided between casement inner wall 19 and the extremity of each paddle in either or both of the open and/or closed position as at 28 and 29 in FIG. 3b The arrangement of co-axis 6 centrally located with the axles 10 and 14 along with the aligned forward positions 27a and 27b provides for a balanced and reduced stress configuration.

In an alternative preferred embodiment (not shown) the axles 10 and 14 may be geared together for corresponding and opposite rotation throughout service life. Such corresponding rotation would more exactly match and balance the stresses and vibrations associated with opening and closing of collapsing paddles 20 and more uniform development of electrical power.

Alternatively, the paddle opening and closing may be guided in association with both the position on the respective wheel and the rotational position of that wheel in the casement 3.

Additionally preferably, casement 3 may be provided with a funnel entry as at 31 in FIG. 4. Co-operating converging vertical surfaces 32 and 33, each in 2 parts, a and b, act to increase the water speed and are adapted to separate water flows into entry streams 17a and 18a.

Figure 6:
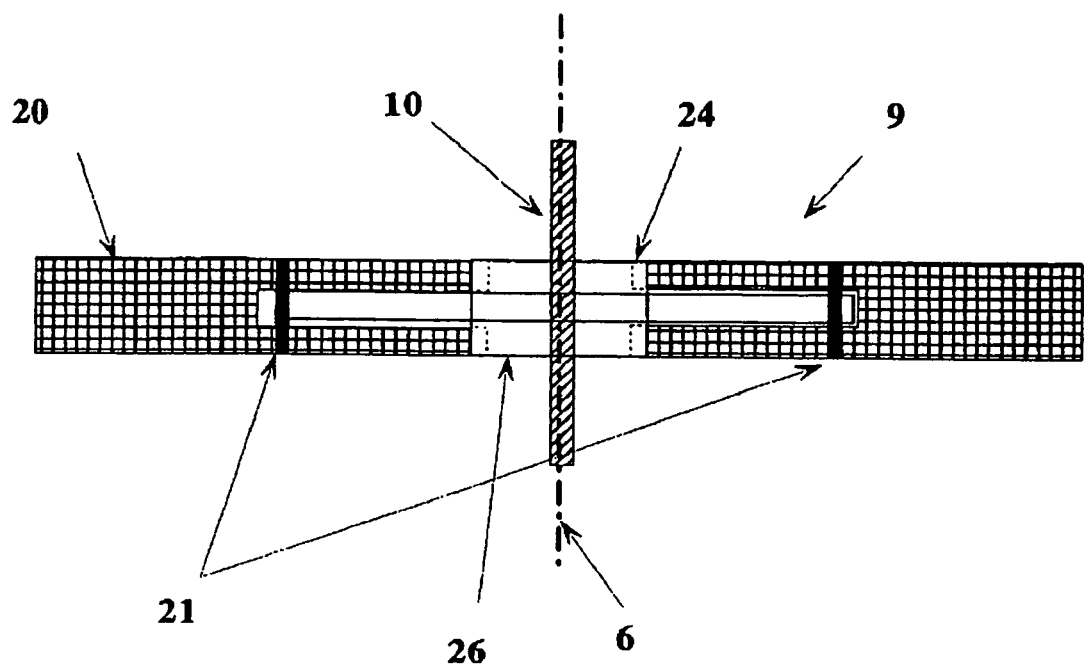
FIG. 6 shows a cross-section of a typical water wheel of the present invention with paddles extended.

FIG. 5 shows a cross-section of entry 31 taken along line A-A in FIG. 4. Surfaces 32a and 32b form a funnel for the upper water flow 17a while surfaces 33a and 33b correspondingly form the lower funnel for water flow 18a. As can be seen water flow 17a is confined and directed onto LT wheel 13 while flow 18a is directed onto RT wheel 9 through channels 17 and 18 respectively FIG. 6 shows the preferred wheel arrangement in greater detail in connection with RT wheel 9 and with paddles on both sides fully extended so as to abut hub 26 at abutment 24.

Figure 7:
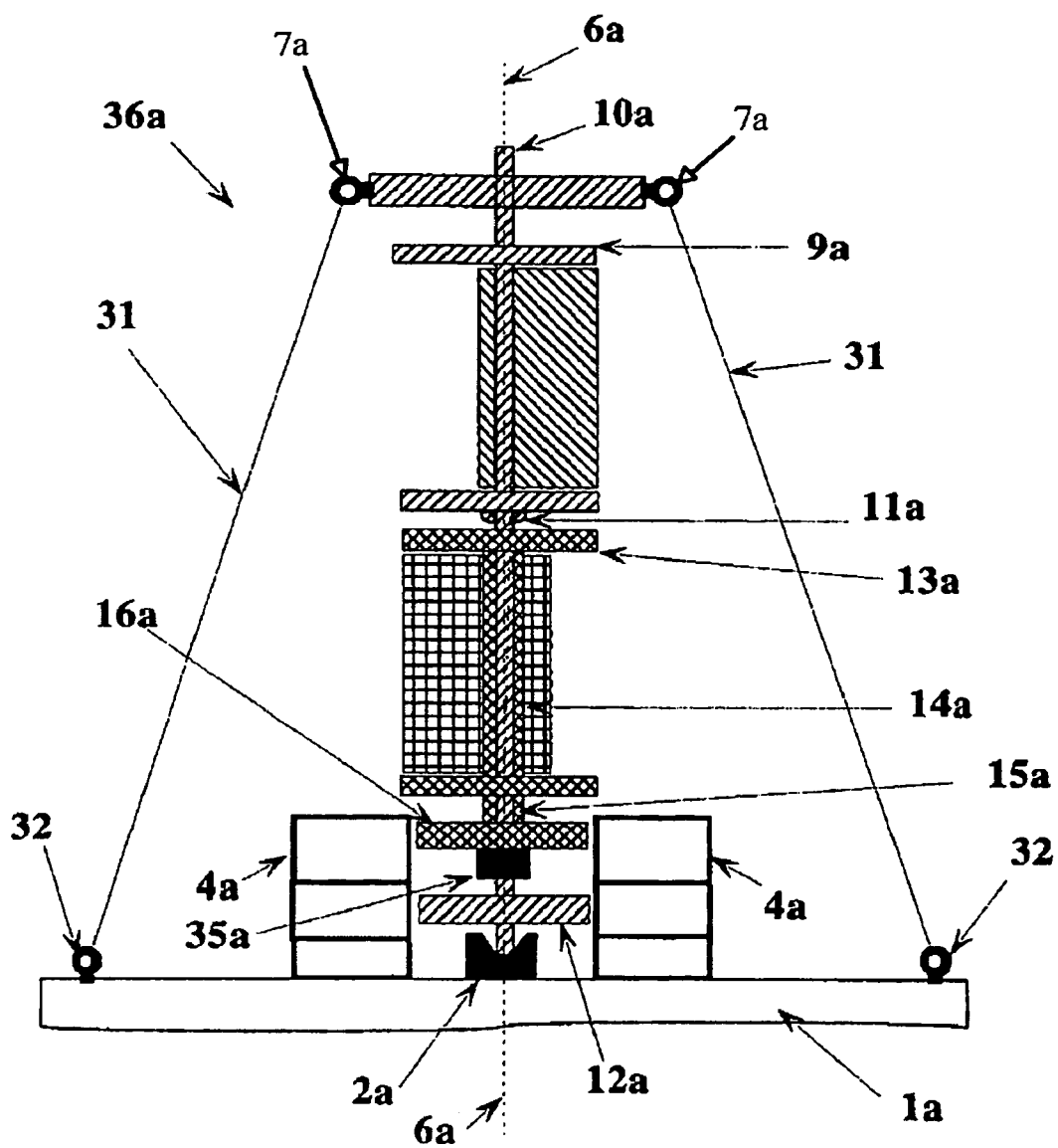
FIG. 7 shows an alternative preferred embodiment of the invention adapted for use as a wind driven wheel/generator pair.

The alternative preferred embodiment shown in FIG. 7 provides a base 1a typically constructed of concrete or like material from which the preferred embodiment extends generally vertically into the moving fluid, wind.

Preferably base 1a includes a main support bearing block 2 and suitable centering and alignment means 2a and generator portion 4a.

Preferably, wind wheel/generator combination, designated 36a, is a single unit with main co-axis 6a extending vertically from block 2a. Lifting eyes 7a are provided for installation and stabilization as by guy wires 31 and base attachments 32.

Right-turning (RT) wheel 9a is fixed to solid central axle 10a as by welding at 11a in FIG. 7.

Rotational motion of the RT wheel 9a is transmitted downwards by axle 1a and causes correspondingly right turning motion of the right-turning generator armature 12a and production of electrical power in known manner.

Left-turning (LT) wind wheel 13a is fixed to tubular control axle 14a as by welding as at 15a in FIG. 7. Rotational motion of the LT wheel 13a is also transmitted downwards by tubular axle 14a and causes corresponding motion of the left-turning (LT) generator armature 16a and production of electrical power.

The vertical position of LT wheel 13a is maintained by bearing block 35a affixed to solid axle 10a.

Axles 14a and 10a are co-axial about co-axis 6a and provide that both the RT and the LT armatures 12a and 16a respectively provide work energy simultaneously to the generator portion 4a.

A casement (not shown), similar to casement 3 as shown schematically in FIG. 2, may be provided with upper and lower fluid or wind channels 17 and 18 respectively which individually direct flow against the LT and RT wheels 13a and 9a on either side of co-axis 6a for opposite rotation of the wheels with a single flow. Since the forces encountered in a wind situation are different from that with water the wheels 13a and 9a preferably have a greater height and may be made of lighter materials as may the optional casement, not shown. FIGS. 3a and 3b depict plan views of this preferred embodiment of the invention as well as that preferred embodiment shown in FIG. 1 with suitable adaptation of the reference numbers to include the reference "a" to specifically refer to the FIG. 7 fluid embodiment.

FIG. 3a depicts the RT (lower) wheel 9a in plan view and its corresponding flow 18a. Flow 18a passes through and around wheel 9a to cause rotation of the wheel 9a on vertical axle 10a about co-axis of rotation 6.

FIG. 3b depicts a plan view of the LT (upper) wheel 13a and its corresponding flow 17a. Wheel 13a is rotated counterclockwise by the movement in flow 17a around tubular axle 14a also about co-axis 6.

Each of the wheels is constructed of a central disk, not separately shown in FIG. 7 but depicted in FIGS. 3 through 6, as at 25a and a hub as at 26 in FIG. 3. A series of paddles 20 are each mounted to the disk 25 for rotation about a vertical axle 21 from a fully open fluid-engaging position 22 to a fully collapsed position 23. In the open position 22 the innermost end of paddle 20 abuts hub 26 and engages the corresponding wheel.

The LT and RT wheels 13a and 9a are also mirror images of each other in plan view in this preferred embodiment and can be constructed of essentially the same components for ease of manufacture, assembly and repair. Preferably each wheel has the same number of equally-spaced identical paddles 20 arranged with their forward positions, as at positions 27a and 27b respectively, in vertical alignment.

Preferably forward positions 27 correspond with the corresponding inner edges 28a and 28b of the fluid flows 18a and 17a respectively.

Significant spacing may be provided between casement inner wall 19 and the extremity of each paddle in either or both of the open and/or closed position as at 22 and 29 in FIG. 3b.

The arrangement of co-axis 6 centrally located with the axles 10a and 14a along with the aligned forward positions 27a and 27b provides for a balanced and reduced stress configuration.

In an alternative preferred embodiment (not shown) the axles 10a and 14a may be geared together for corresponding and opposite rotation throughout service life. Such corresponding rotation would more exactly match and balance the stresses and vibrations associated with opening and closing of collapsing paddles 20 and more uniform development of electrical power.

Alternatively, the paddle opening and closing may be guided in association with both the position on the respective wheel and the rotational position of that wheel in the casement 3.

Additionally preferably, generator 36a may be provided with funnel-shaped entries such as depicted in FIGS. 4 and 5 with suitable adaptations of vertical dimensions to reflect the greater vertical size of wheels 9a and 13a.

It will be obvious to those skilled in the art that modifications may be made to the embodiments described above without departing from the scope of the present invention.

What I claim is:

1. A water wheel generator comprising:
   a first water wheel and generator pair mounted on a first vertical axle for rotation about a first vertical axis;

a second water wheel and generator pair mounted on a second vertical axle for co-rotation with said first fluid wheel and generator pair about said first vertical axis;
wherein said second vertical axle is adapted for rotation about said first vertical axle;
wherein said first and second water wheels are mounted for immersion in a stream of moving water; and
wherein said first and second generators are both mounted above said first and second water wheels and out of said moving stream of water.

2. A water wheel generator comprising:
a first water wheel and generator pair mounted on a first vertical axle for rotation about a vertical axis;
a second water wheel and generator pair mounted on a second vertical axle for co-rotation with said first fluid wheel and generator pair about said first vertical axis;
a central hub adapted to substantially exclude said moving stream of water from the body of said central hub; and
a plurality of paddles for engaging the said stream of moving water;
wherein said second vertical axle is adapted for rotation about said first vertical axle;
wherein said first and second water wheels are mounted for immersion in a stream of moving water; and
wherein said first and second generators are both mounted above said first and second water wheels and out of said moving stream of water.

3. The water wheel generator according to claim 2 wherein each of said paddles is mounted to said central hub for rotation about a paddle vertical axis from a closed and substantially inoperative position to an open and moving water engaging position.

4. The water wheel generator according to claim 3 wherein each said paddle vertical axis is substantially spaced from said central hub.

5. The water wheel generator according to claim 4 wherein said vertical axis is intermediate the ends of each said paddle.

6. The water wheel generator according to claim 5 wherein said paddles extend from said central hub beyond said vertical axis when engaging the said water flow.

7. The water wheel generator according to claim 6 wherein said paddles substantially close off water flow when in the return position.

8. The water wheel generator according to claim 7 wherein said paddles engage at least one adjacent paddle when in the return position so as to substantially prevent free rotation of said paddles.

9. The wheel generator according to claim 8 further comprising a cavity containing each said water wheel and wherein said water flow is directed in each of said cavities onto said paddles in the engaging position and away from said paddles in the return position.

10. The water wheel generator according to claim 9 wherein each said cavity is substantially closed to water flow by said paddles in the return position.

11. The water wheel generator according to claim 10 wherein each said cavity is closely filled by said paddles in said return position.

12. The water wheel generator according to claim 11 wherein said cavity includes a water entry inlet funnel adapted to compel said moving water to primarily engage those of said paddles in the operating position.

13. The water wheel generator according to claim 12 wherein said water entry is aligned between said first vertical axis and those of said paddles in the operative position.

14. The water wheel generator according to claim 13 wherein each said cavity is offset from the said first vertical axis so as to engage said paddles both in the engaging position and in the return position.

15. A fluid wheel generator comprising:
a first fluid wheel and generator pair mounted on a first vertical axle for rotation about a vertical axis;
a second fluid wheel and generator pair mounted on a second vertical axle for co-rotation with said first fluid wheel and generator pair about said first vertical axis;
wherein said second vertical axle adapted for rotation about said first vertical axle;
wherein said first and second fluid wheels mounted for immersion in a stream of moving fluid;
wherein said first and second generators both mounted below said first and second fluid wheels; and
wherein each of said wheels comprises:
a central hub adapted to substantially exclude said moving stream of fluid from the body of said central hub; and
a plurality of paddles for engaging the said stream of moving fluid each mounted to said central hub for rotation about a paddle vertical axis from a closed and substantially inoperative position to an open and moving fluid engaging position.

16. The fluid wheel generator according to claim 15 wherein each said paddle vertical axis is substantially spaced from said central hub.

17. The fluid wheel generator according to claim 16 wherein said vertical axis is intermediate the ends of each said paddle.

18. The fluid wheel generator according to claim 17 wherein said paddles extend from said central hub beyond said vertical axis when engaging the said fluid flow.

19. The fluid wheel generator according to claim 18 wherein said paddles substantially close off fluid flow when in the return position and wherein said paddles engage at least one adjacent paddle when in the return position so as to substantially prevent free rotation of said paddles.

20. The fluid wheel generator according to claim 19 further comprising:
a cavity containing each said fluid wheel;
wherein said fluid flow is directed in said cavity onto said paddles in the engaging position and away from said paddles in the return position;
wherein said cavity is substantially closed to water flow by said paddles in the return position;
wherein said cavity is closely filled by said paddles in said return position;
wherein each said cavity is offset from the said first vertical axis so as to engage said paddles both in the engaging position and in the return position;
wherein said cavity includes a fluid entry funnel adapted to compel said moving fluid to primarily engage those of said paddles in the operating position; and
wherein said fluid entry funnel is aligned between said first vertical axis and said paddles in the operative position.

* * * * *